(12) United States Patent
Sakurada et al.

(10) Patent No.: US 11,057,575 B2
(45) Date of Patent: Jul. 6, 2021

(54) IN-VEHICLE DEVICE, PROGRAM, AND VEHICLE FOR CREATING COMPOSITE IMAGES

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/671,335

(22) Filed: Nov. 1, 2019

(65) Prior Publication Data
US 2020/0186730 A1   Jun. 11, 2020

(30) Foreign Application Priority Data
Dec. 11, 2018 (JP) .............................. JP2018-231854

(51) Int. Cl.
*H04N 7/18* (2006.01)
*H04N 5/272* (2006.01)
*H04N 5/225* (2006.01)
*H04N 5/247* (2006.01)
*B60R 11/00* (2006.01)
*B60R 11/04* (2006.01)

(52) U.S. Cl.
CPC .......... *H04N 5/272* (2013.01); *H04N 5/2253* (2013.01); *H04N 5/247* (2013.01); *B60R 11/04* (2013.01); *B60R 2011/0003* (2013.01); *B60R 2011/004* (2013.01)

(58) Field of Classification Search
CPC ....................................................... H04N 5/272
USPC ......................................................... 348/148
See application file for complete search history.

(56) References Cited

U.S. PATENT DOCUMENTS

| 5,469,536 | A  | * | 11/1995 | Blank ................. | H04N 1/3873 |
|           |    |   |         |                        | 345/594     |
| 5,566,251 | A  | * | 10/1996 | Hanna ................. | H04N 5/272  |
|           |    |   |         |                        | 348/588     |
| 7,044,742 | B2 | * | 5/2006  | Sumiya ................ | G08B 23/00  |
|           |    |   |         |                        | 340/425.5   |
| 8,238,617 | B2 | * | 8/2012  | Omoto ................. | B60R 25/25  |
|           |    |   |         |                        | 382/118     |
| 9,842,266 | B2 | * | 12/2017 | Bulan ................. | G06K 9/4642 |
| 2003/0117728 | A1 | * | 6/2003 | Hutzel ................ | H04N 7/181  |
|           |    |   |         |                        | 359/838     |

(Continued)

FOREIGN PATENT DOCUMENTS

JP    2008-168714 A    7/2008

*Primary Examiner* — Leron Beck
(74) *Attorney, Agent, or Firm* — Oblon, McClelland, Maier & Neustadt, L.L.P.

(57) ABSTRACT

An in-vehicle device includes a first in-vehicle camera configured to capture a subject in the cabin of a vehicle to create a first captured image, a second in-vehicle camera configured to capture an outside scene to create a second captured image, an image processing unit configured to create, from the first and second captured images, a composite image in which the subject is arranged with the outside scene as a background, and a first communication unit configured to send the composite image.

11 Claims, 5 Drawing Sheets

(56) References Cited

U.S. PATENT DOCUMENTS

| | | | |
|---|---|---|---|
| 2008/0186382 A1* | 8/2008 | Tauchi | G01S 13/89 348/148 |
| 2009/0233572 A1* | 9/2009 | Basir | H04L 67/303 455/404.1 |
| 2009/0244296 A1* | 10/2009 | Petrescu | H04N 5/23293 348/207.99 |
| 2012/0054028 A1* | 3/2012 | Tengler | G06Q 30/02 705/14.49 |
| 2012/0105635 A1* | 5/2012 | Erhardt | G08B 13/19647 348/148 |
| 2012/0140073 A1* | 6/2012 | Ohta | B60R 25/1012 348/148 |
| 2014/0085469 A1* | 3/2014 | Sakano | H04N 17/002 348/148 |
| 2014/0192181 A1* | 7/2014 | Taylor | H04N 5/23293 348/118 |
| 2015/0029206 A1* | 1/2015 | Bialota | G06T 11/00 345/589 |
| 2015/0319360 A1* | 11/2015 | Sato | H04N 5/23206 348/207.11 |
| 2016/0042543 A1* | 2/2016 | Hashimoto | H04N 5/23229 345/629 |

\* cited by examiner

IN-VEHICLE DEVICE, PROGRAM, AND VEHICLE FOR CREATING COMPOSITE IMAGES

INCORPORATION BY REFERENCE

The disclosure of Japanese Patent Application No. 2018-231854 filed on Dec. 11, 2018, including the specification, drawings, and abstract is incorporated herein by reference in its entirety.

BACKGROUND

1. Technical Field

The present disclosure relates to an in-vehicle device, a program, and a vehicle.

2. Description of Related Art

An in-vehicle camera for capturing a subject outside a vehicle, such as other vehicles or obstacles, and an in-vehicle camera for capturing the inside of the vehicle in order to monitor or record a situation of an occupant are commonly known as so-called in-vehicle cameras. Furthermore, Japanese Unexamined Patent Application Publication No. 2008-168714 (JP 2008-168714 A) discloses that an overhead image obtained by capturing the inside of a vehicle and an overhead image obtained by capturing the outside of the vehicle, which are captured from the same direction, are combined, thereby creating a composite image simultaneously viewing the inside and outside of the vehicle, as a technology for comprehensively using cameras located inside and outside the vehicle.

SUMMARY

The disclosure described in JP 2008-168714 A has an advantageous effect of allowing a user who is a driver to recognize a situation of a rear seat. However, the disclosure can be further improved for convenience for the user.

Considering the issue stated above, the present disclosure provides an in-vehicle device and the like for improved convenience for a user.

An in-vehicle device according to one aspect of the present disclosure includes a first in-vehicle camera configured to capture a subject in the cabin of a vehicle to create a first captured image, a second in-vehicle camera configured to capture an outside scene to create a second captured image, and an image processing unit configured to create, from the first and second captured images, a composite image in which the subject is arranged with the outside scene as a background.

A program according to another aspect of the present disclosure causes a mobile terminal to execute processing including receiving an instruction to cause an in-vehicle device to create, from a captured image obtained by capturing a subject in the cabin of a vehicle and a captured image obtained by capturing an outside scene, a composite image in which the subject is arranged with the outside scene as a background, and sending the instruction to the in-vehicle device to cause the in-vehicle device to create the composite image.

A program according to still another aspect of the present disclosure causes an in-vehicle device to execute processing including causing a first in-vehicle camera to capture an image, the first in-vehicle camera being configured to capture a subject in the cabin of a vehicle to create a first captured image, causing a second in-vehicle camera to capture an image, the second in-vehicle camera being configured to capture an outside scene to create a second captured image, and creating, from the first and second captured images, a composite image in which the subject is arranged with the outside scene as a background.

With the in-vehicle device and the like of the present disclosure, convenience for a user can be further improved.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a sequence diagram illustrating operation of the in-vehicle device and the like;

DETAILED DESCRIPTION OF EMBODIMENTS

Hereinafter, one embodiment will be described with reference to the drawings.

Figure 1:
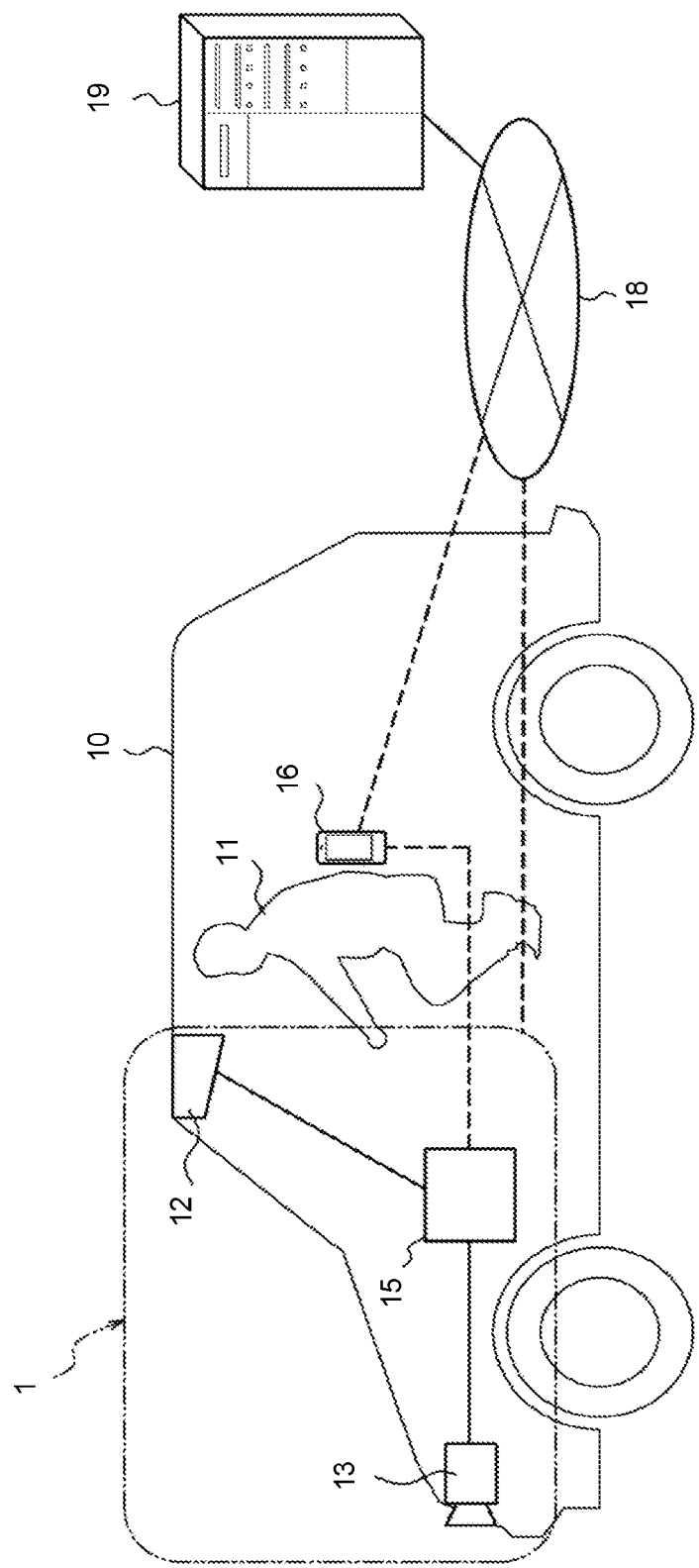
FIG. 1 is a diagram illustrating a configuration of an in-vehicle device.

FIG. 1 illustrates a configuration of an in-vehicle device 1 according to one embodiment. The in-vehicle device 1 is mounted on a vehicle 10. The vehicle 10 is, for example, an automobile, but is not limited thereto and may be any vehicle which a user can board. The in-vehicle device 1 includes a first in-vehicle camera 12 capturing a subject (user) 11 in the cabin of the vehicle 10, a second in-vehicle camera 13 capturing an outside scene, and a control device 15. The control device 15 is connected to the in-vehicle cameras 12, 13 to perform overall control on the cameras, and has a navigation function, for example. Further, the in-vehicle device 1 is connected to a mobile terminal 16 in a wired or wireless manner to enable information communication. Moreover, the in-vehicle device 1 and the mobile terminal 16 are connected to a server 19 via a network 18 in a wired or wireless manner to enable information communication with the server 19.

When the user 11 boards the vehicle 10 and the vehicle 10 travels, the in-vehicle camera 12 captures an image of the user 11 in the vehicle cabin, and the in-vehicle camera 13 captures an image of an outside scene. A composite image is created in the control device 15 from an image portion of the user 11 in the captured image of the vehicle cabin and the captured image of the outside scene, which includes the user 11 with the outside scene as a background. The created composite image is sent from the control device 15 to the mobile terminal 16 or the server 19. The user 11 can, via the mobile terminal 16, obtain the composite image from the control device 15 or the server 19, and can see the composite image. As such, the in-vehicle device 1 can stimulate the interest of the user 11 and can provide improved entertainment.

Next, each component of the in-vehicle device 1 will be described.

The in-vehicle cameras 12, 13 capture images under the control of the control device 15. The in-vehicle camera 12 is an in-camera which is, for example, mounted inside or in the vicinity of a rearview mirror to capture the inside of the cabin of the vehicle 10. The in-vehicle camera 12 captures, from substantially the front, for example, images of the user 11, who boards the vehicle 10 in a direction in which the vehicle 10 travels, and other occupants in the vehicle 10. The in-vehicle device 1 includes, for example, any one or a combination of in-vehicle cameras 13, which are mounted on the front, side, or rear of the vehicle 10, for capturing the outside scene in the front, side, or rear in a traveling direction. Further, each of the in-vehicle cameras 12, 13 may be a monocular camera or a stereo camera. The in-vehicle cameras 12, 13 respectively capture periodically (for example, every millisecond or every second) to create the captured images. The in-vehicle camera 12 sends, to the control device 15, the captured image of the vehicle cabin including the user 11. Additionally, the in-vehicle camera 13 sends, to the control device 15, the captured image of the outside scene created by capturing.

Figure 2:
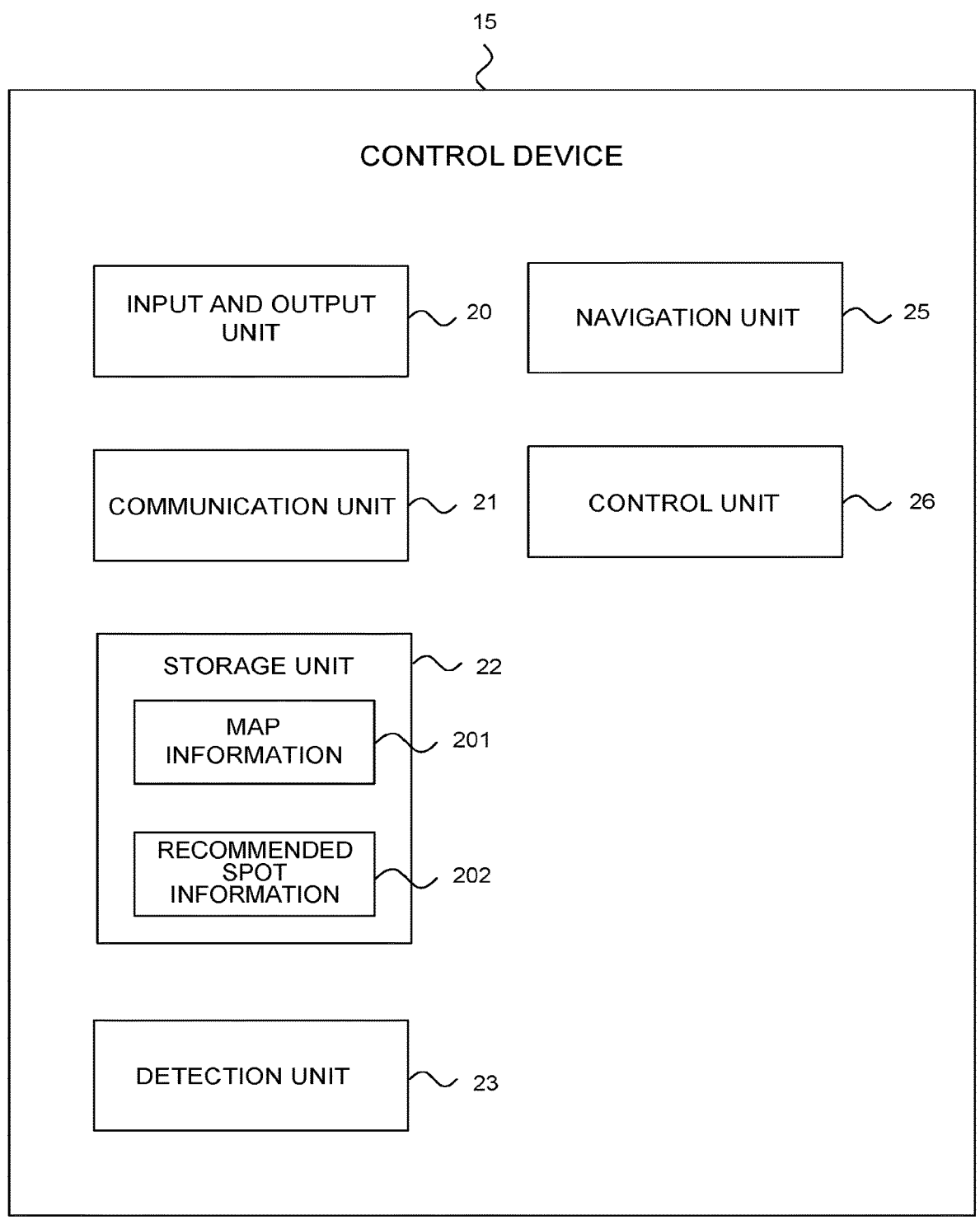
FIG. 2 is a diagram illustrating a configuration of a control device.

FIG. 2 illustrates a configuration of the control device 15. The control device 15 includes an input and output unit 20, a communication unit 21, a storage unit 22, a detection unit 23, a navigation unit 25, and a control unit 26. The control device 15 may be a single device or may be configured by a plurality of devices.

The input and output unit 20 has an input interface that detects input of the user 11 and sends the input information to the navigation unit 25, the control unit 26, and the like. Examples of the input interface may include a physical key, a capacitive key, a touchscreen integrally installed with a panel display, or a microphone that receives audio input. However, the input interface is not limited thereto, and may be any input interface. Further, the input and output unit 20 includes an output interface that outputs to the user 11 information created by the navigation unit 25 or the control unit 26, or information obtained from the mobile terminal 16 or the server 19. Examples of the output interface may include a panel display that outputs information as an image or video, a head-up display, and a speaker that outputs information as sound. However, the output interface is not limited thereto, and may be any output interface.

The communication unit 21 has one or more communication modules. Examples of the communication module may include a module corresponding to a near-field wireless communication standard, such as Bluetooth®, a wired local area network (LAN) standard, and a wireless LAN standard. Examples of the communication module may include a module corresponding to a mobile communication standard, such as 4G (4th Generation) and 5G (5th Generation). The communication module further includes a global positioning system (GPS) receiving module. Furthermore, the communication unit 21 may have a communication device, such as a data communication module (DCM). The control device 15 performs information communication with the mobile terminal 16 via the communication unit 21. The control device 15 is also connected to the network 18 via the communication unit 21 and performs information communication with the server 19. Further, the control device 15 receives a GPS signal via the communication unit 21.

The storage unit 22 includes one or more memories. Each memory included in the storage unit 22 is, for example, a semiconductor memory, a magnetic memory, or an optic memory, but is not limited thereto. Each memory functions as, for example, a primary storage device, a secondary storage device, or a cache memory. The storage unit 22 stores any information used in the operation of the control device 15. The storage unit 22 may store, for example, a control and processing program and embedded software. In addition, the storage unit 22 stores map information 201 and recommended spot information 202. The recommended spot information 202 includes information on a spot in which the user 11 is suggested to create the composite image, such as a scenic spot.

The detection unit 23 includes various sensors that detect, for example, the vehicle speed, braking, acceleration, steering angle, yaw rate, and direction. The detection unit 23 sends detection results of various sensors to the navigation unit 25 and the control unit 26 at a predetermined cycle.

The navigation unit 25 implements a navigation function via the control device 15. The navigation unit 25 includes one or more processors that perform processing related to route guidance. The navigation unit 25 acquires the map information 201 from the storage unit 22 and the input information input by the user 11 from the input and output unit 20. Further, the navigation unit 25 acquires, from the control unit 26, current location (for example, a latitude and a longitude) of the vehicle 10 detected by the control unit 26. The navigation unit 25 presents information for route guidance to the user 11 via the input and output unit 20 based on the input information by the user 11, schedule information, the current location, and the like.

The control unit 26 has one or more processors. Each processor is a general-purpose processor or a dedicated processor specialized for a specific processing, but is not limited thereto. For example, an electronic control unit (ECU) mounted on the vehicle 10 may function as the control unit 26. The control unit 26 integrally controls operations of the control device 15 and the in-vehicle cameras 12, 13. In addition, the control unit 26 has a time measuring function for obtaining the current time.

Figure 3:
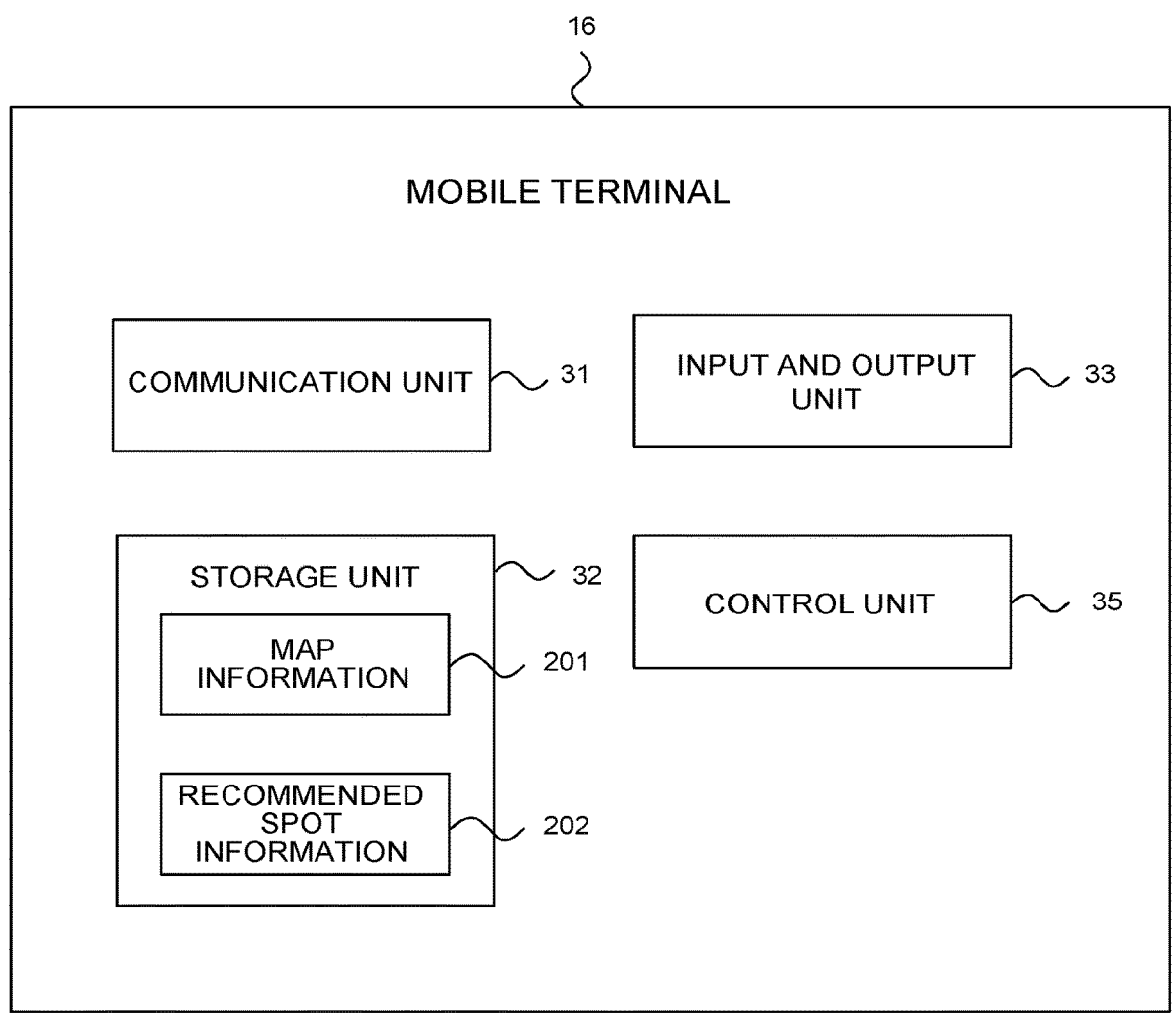
FIG. 3 is a diagram illustrating a configuration of a mobile terminal.

FIG. 3 illustrates a configuration of the mobile terminal 16. The mobile terminal 16 includes a communication unit 31, a storage unit 32, an input and output unit 33, and a control unit 35. The mobile terminal 16 is, for example, a portable electronic device, such as a smartphone, a tablet, or the like.

The communication unit 31 has one or more communication modules connected to the network 18. The communication module may include, for example, modules corresponding to the mobile communication standard, such as 4G and 5G. The mobile terminal 16 is connected to the network 18 via the communication unit 31. The communication module includes a GPS receiving module. The mobile terminal 16 receives a GPS signal representing the current location via the communication unit 31.

The storage unit 32 includes one or more memories. Each memory is, for example, a semiconductor memory, but is not limited thereto. Each memory may function as, for example, a primary storage device, a secondary storage device, or a cache memory. The storage unit 32 stores any information related to control and processing operations of the mobile terminal 16. Further, the storage unit 32 may store the map information 201 and the recommended spot information 202.

The input and output unit 33 has an input interface that detects input of the user 11 and sends the input information to the control unit 35. Examples of the input interface may include a physical key, a capacitive key, a touchscreen integrally installed with a panel display, or a microphone that receives audio input. However, the input interface is not limited thereto, and may be any input interface. Further, the input and output unit 33 includes an output interface that outputs to the user 11 information created by the control unit 35, or information read from the storage unit 32. Examples of the output interface may include a panel display that outputs information as an image or video, and a speaker that outputs information as a sound. However, the output interface is not limited thereto, and may be any output interface.

The control unit 35 has one or more processors. Each processor is, for example, a general-purpose processor or a dedicated processor specialized for a specific processing, but is not limited thereto. The control unit 35 controls the operation of the mobile terminal 16 and executes various application programs according to a control and processing program stored in the storage unit 32. The control unit 35 can also implement a navigation function by executing an application program for navigation.

As illustrated in FIG. 1, the server 19 is a single computer or a plurality of computers capable of communicating with each other, and includes a communication unit including one or more communication modules connected to the network 18, a storage unit that stores any information, control and processing programs, and the like, which are used in the operation of the server 19, and a control unit including one or more processors that control the operation of the server 19 according to the control and processing programs.

Figure 4:
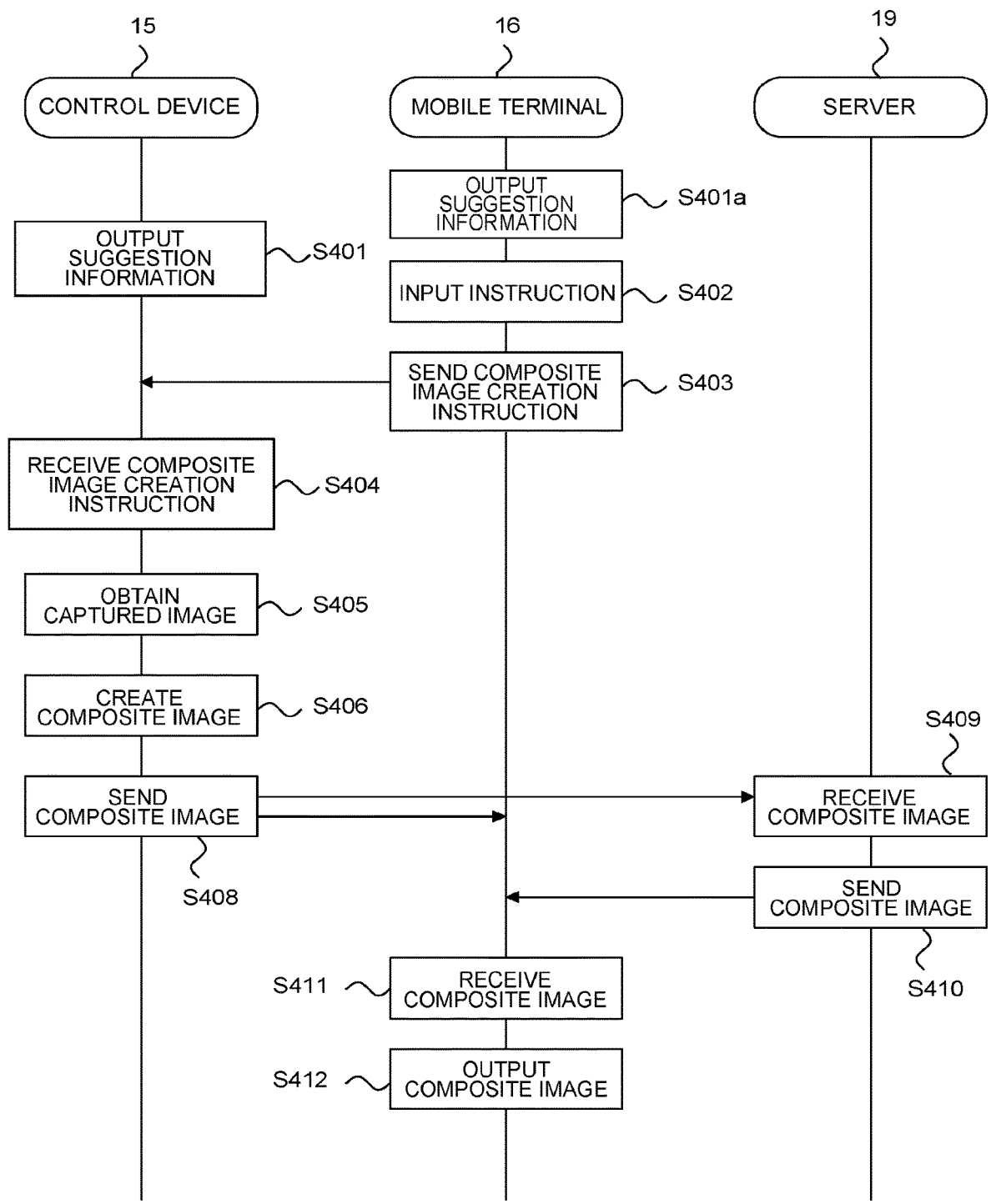

FIG. 4 is a sequence diagram illustrating an operation sequence of the in-vehicle device 1. The sequence illustrated in FIG. 4 is triggered by any event occurring when the vehicle 10 travels, for example, when the control device 15 detects movement from the current location, when the navigation unit 25 starts route guidance, and when the user 11 instructs to start the operation via the mobile terminal 16.

When the vehicle 10 approaches a scenic spot or the like, the control device 15 outputs suggestion information which suggests, to the user 11, creating the composite image (step S401). The control unit 26 that performs step S401 corresponds to the "suggestion unit". For example, in the control device 15, the control unit 26 reads the map information 201 and the recommended spot information 202 from the storage unit 22. When the current location approaches a recommended image capturing spot closer than any reference on the map, the control unit 26 outputs the suggestion information that suggests creating the composite image to the input and output unit 20. The recommended image capturing spot being on a route guided by the navigation unit 25 may be a condition for outputting the suggestion information. For example, the control unit 26 outputs a message, such as "there is a photo spot 200 meters ahead, on your right". The suggestion information may be output by a display or a sound. Further, the suggestion information may be output to the user 11 when the mobile terminal 16 detects movement from the current location and the user 11 approaches a scenic spot, and the like (step S401a). In the mobile terminal 16, for example, the control unit 35 also reads the map information 201 and the recommended spot information 202 from the storage unit 32, and outputs the suggestion information from the input and output unit 33 via the same processing.

When the user 11 responds to the suggestion information output from the control device 15 or the mobile terminal 16 and inputs an instruction to the mobile terminal 16 at a time when the user 11 wants to take a photo (step S402), the mobile terminal 16 sends a composite image creation instruction to the control device 15 in response to the instruction from the user 11 (step S403). When receiving the composite image creation instruction (step S404), the control device 15 obtains the captured images from the in-vehicle cameras 12, 13 (step S405). In the mobile terminal 16, for example, the control unit 26 displays objects, such as icons for instruction or the like, on the input and output unit 20, and detects a touch of the user 11 on the objects. Alternatively, the mobile terminal 16 is also capable of receiving a voice input of the instruction. In this case, the mobile terminal 16 sends the composite image creation instruction to the control device 15 by the communication unit 21. The in-vehicle cameras 12, 13 capture the images periodically. Meanwhile, when receiving the instruction from the mobile terminal 16 by the communication unit 21 in the control device 15, the control unit 26 obtains the captured images, for example, the latest captured image at such time, from the in-vehicle cameras 12, 13. Furthermore, in a modification in which the instruction is input by a voice, the control device 15 may directly receive the voice input.

Figure 5A:
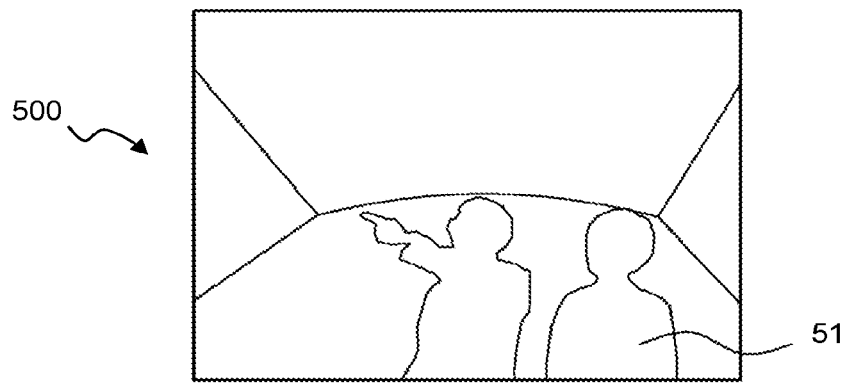
FIG. 5A is a diagram illustrating examples of a captured image and a composite image.
Figure 5B:
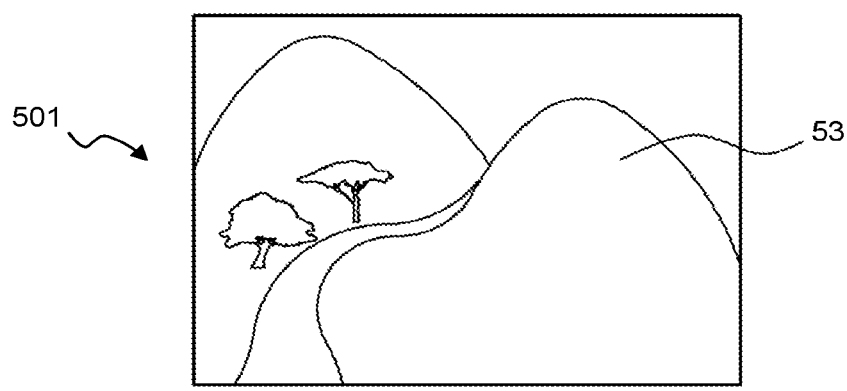
FIG. 5B is a diagram illustrating examples of a captured image and a composite image.
Figure 5C:
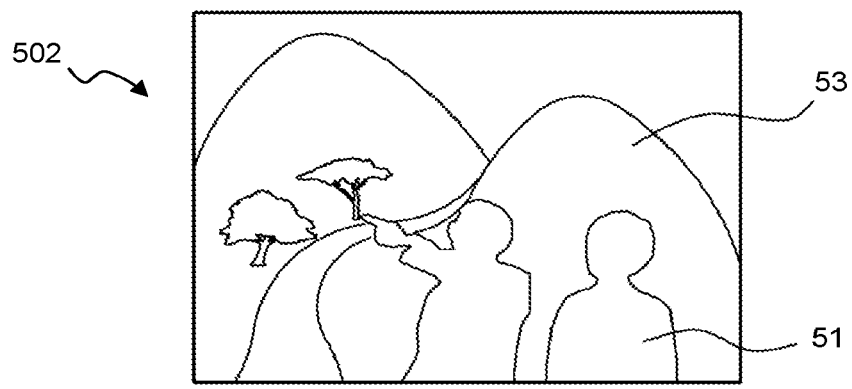
FIG. 5C is a diagram illustrating examples of a captured image and a composite image.

Next the control device 15 creates a composite image by combining the captured image of the in-vehicle camera 12 and the captured image of the in-vehicle camera 13 (step S406). For example, the control unit 25 combines a captured image 500 of the in-vehicle camera 12 as illustrated in FIG. 5A, and a captured image 501 of the in-vehicle camera 13 as illustrated in FIG. 5B. The captured image 500 of the in-vehicle camera 12 includes a subject image 51 of the user 11 and the passengers (the term "passenger" may encompass animals, such as pets), and a background image 52 of scenes outside the vehicle cabin. Meanwhile, the captured image 501 of the in-vehicle camera 13 includes an outside scene 53, such as a scenic spot. The control unit 26 extracts the subject image 51 from the captured image 500 by removing the background image 52, and superimposes the captured image 501 thereon. As such, as illustrated in FIG. 5C, a composite image 502 is created in which the subject image 51 is arranged with the outside scene 53 as a background. For example, the subject image 51 may be discretionarily enlarged or reduced. Further, for example, a position at Which the subject image 51 is arranged is discretionarily set. Alternatively, an enlargement and reduction ratio or a position of the subject image 51 may be set in advance by the processing program executed by the control unit 26, or may be set in the control device 15 as operated by the user 11 on the mobile terminal 16. Further, any image processing method may be used in the image composition. In addition, the captured image and the composite image may be appropriately corrected by any method. Moreover, it is possible to insert a time stamp, vehicle speed information, current location information, or the like into the composite image 502, thereby helping the user 11 recall memories and arousing the user's interest. The control unit 26 that performs step S406 corresponds to the "image processing unit". The control unit 26 that performs step S406 corresponds to the "image processing unit".

Returning to FIG. 4, the control device 15 sends the created composite image to the mobile terminal 16 (step S408). Then, the mobile terminal 16 receives the composite image (step S411). In the control device 15, for example, the control unit 26 sends the composite image to the mobile terminal 16 via the communication unit 21. In this case, the control unit 35 receives the composite image via the communication unit 31 in the mobile terminal 16. Alternatively, the control device 15 may send the composite image to the mobile terminal 16 via the server 19. For example, when the control device 15 sends the composite image to the server 19 (step S408), the server 19 receives and stores the composite image (step S409). Then the server 19 sends the composite image to the mobile terminal 16 in response to a request from the mobile terminal 16 (step S410), and the mobile terminal 16 receives the composite image (step S411). By sending the composite image to the server 19, it is possible to create, for example, an archive of the composite images on the server 19, thereby saving the storage capacity of the mobile terminal 16.

Subsequently, the mobile terminal 16 outputs the composite image (step S412). In the mobile terminal 16, the control unit 35, for example, outputs and displays the composite image via the input and output unit 33. For example, as illustrated in FIG. 5C, the composite image 502 is displayed.

FIG. 4 illustrates the procedure in which the user 11 inputs the composite image creation instruction to the mobile terminal 16 in response to the output of the suggestion information, which is suggested image capturing by the control device 15 or the mobile terminal 16. However, the suggestion information output is not necessarily required, and the user 11 may input the instruction as needed.

As stated above, according to the in-vehicle device 1 of the present embodiment, for example, even in a case where a parking space is not found in a scenic spot with many visitors, the user can take commemorative photos at the scenic spot while staying in the vehicle cabin. Moreover, in a case of severe outside conditions, such as a high temperature, a low temperature, and bad weather, the user can easily take memorial photos without leaving the vehicle.

In the present embodiment, the in-vehicle device 1 may output the composite image on the input and output unit 20, instead of or in addition to sending the created composite image to the mobile terminal 16, as long as there is no driver distraction. As such, the user can see the composite image without using the mobile terminal 16. Moreover, the in-vehicle device 1 may automatically create the composite image when the vehicle 10 approaches the recommended spot. Accordingly, convenience for the user 11 is improved.

Although the present disclosure has been described with reference to the drawings and the embodiments, it is to be noted that a person skilled in the art can easily make variations and modifications thereto, based on the present disclosure. Therefore, it is also to be noted that these variations and modifications fall within the scope of claims. For example, functions and the like included in each element, each step, or the like, can be rearranged so as not to be logically contradictory, and a plurality of elements, steps, or the like, may be combined into one or divided. Further, the programs that cause the control unit 26 of the control device 15 to execute the operations according to the present embodiment are also encompassed in the scope of claims.

Moreover, examples of the network 18 according to the present embodiment include an ad hoc network, a LAN, a metropolitan area networks (MAN), a cellular network, a wireless personal area networks (WPAN), a public switched telephone networks (PSTN), a terrestrial wireless network, an optical network, other networks or any combination thereof, in addition to the examples stated above. The components of a wireless network include, for example, an access point (for example, a Wi-Fi access point) and a femtocell. In addition, the wireless communication device can connect to a wireless network using, other than Bluetooth®, cellular communication technology, or other wireless technologies and technology standards.

Thus, various features in the present disclosure can be implemented in many different aspects, and such aspects are all included within the scope of the present embodiments.

What is claimed is:

1. An in-vehicle device comprising:
a first in-vehicle camera configured to capture a subject in a cabin of a vehicle to create a first captured image;
a second in-vehicle camera configured to capture an outside scene to create a second captured image; and
an image processing unit configured to create, from the first and second captured images, a composite image in which the first captured image is processed so that only the subject, which is located in the cabin of the vehicle and not part of the cabin of the vehicle, is extracted from the first captured image and the outside scene in the second captured image is superimposed thereon so that the subject is arranged with the outside scene as a background,
wherein the first captured image includes a subject image consisting of at least one of a user and a passenger located in the cabin of the vehicle.

2. The in-vehicle device according to claim 1, further comprising:
a suggestion unit configured to output information to suggest creating the composite image based on location information of the vehicle.

3. The in-vehicle device according to claim 1, wherein the image processing unit is configured to create the composite image in response to an input instruction.

4. A non-transitory computer readable medium that stores an executable program, wherein the program, when executed, causes a mobile terminal to execute processing comprising:
receiving an instruction to cause an in-vehicle device to create, from a captured image obtained by capturing a subject in a cabin of a vehicle and a captured image obtained by capturing an outside scene, a composite image in which the subject is arranged with the outside scene as a background; and
sending the instruction to the in-vehicle device to cause the in-vehicle device to create the composite image by processing the first captured image so that only the subject, which is located in the cabin of the vehicle and not part of the cabin of the vehicle, is extracted from the first captured image and the outside scene in the second captured image is superimposed thereon,
wherein the first captured image includes a subject image consisting of at least one of a user and a passenger located in the cabin of the vehicle.

5. A non-transitory computer readable medium that stores an executable program, wherein the program, when executed, causes an in-vehicle device to execute processing comprising:
causing a first in-vehicle camera to capture an image, the first in-vehicle camera being configured to capture a subject in a cabin of a vehicle to create a first captured image;
causing a second in-vehicle to capture an image, the second in-vehicle camera being configured to capture an outside scene to create a second captured image; and
creating, from the first and second captured images, a composite image in which the first captured image is processed so that only the subject, which is located in the cabin of the vehicle and not part of the cabin of the vehicle, is extracted from the first captured image and the outside scene in the second captured image is superimposed thereon so that the subject is arranged with the outside scene as a background,
wherein the first captured image includes a subject image consisting of at least one of a user and a passenger located in the cabin of the vehicle.

6. A vehicle comprising:
the in-vehicle device according to claim 1.

7. The in-vehicle device according to claim 1, wherein the composite image does not include an image of the cabin of the vehicle itself.

8. The non-transitory computer readable medium according to claim 4, wherein the composite image does not include an image of the cabin of the vehicle itself.

9. The non-transitory computer readable medium according to claim 5, wherein the composite image does not include an image of the cabin of the vehicle itself.

10. The in-vehicle device according to claim 1, wherein the image processing unit is configured to modify at least one of a size of the subject image or a position of the subject image.

11. The in-vehicle device according to claim 1, wherein the image processing unit is configured to insert at least one of a time stamp, vehicle speed information, and current location information into the composite image.

\* \* \* \* \*